W. B. Noyes.
Saw Teeth.

No. 95,602.          Patented Oct. 5, 1869.

Witnesses
Jno. A. Ellis.
A. Smith

Inventor
W. B. Noyes.
J. H. Alexander,
Atty.

United States Patent Office.

W. B. NOYES, OF MANCHESTER, NEW HAMPSHIRE, ASSIGNOR TO HIMSELF AND C. S. BAKER, OF SAME PLACE.

Letters Patent No. 95,602, dated October 5, 1869.

IMPROVEMENT IN SAW-TEETH.

The Schedule referred to in these Letters Patent and making part of the same.

*To all whom it may concern:*

Be it known that I, W. B. NOYES, of Manchester, in the county of Hillsborough, and State of New Hampshire, have invented certain new and useful Improvements in Saws; and I do hereby declare that the following is a full, clear, and exact description thereof, reference being had to the accompanying drawings, and to the letters of reference marked thereon, which form a part of this specification, and in which—

Figure 1:
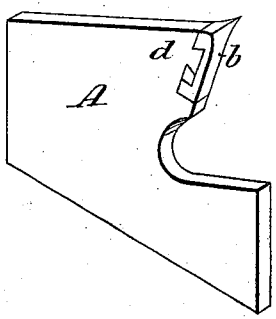
Figure 2:
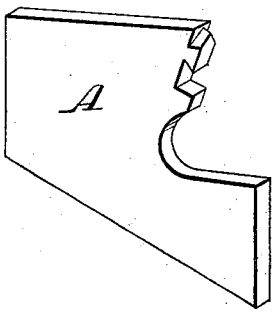

Figure 1 represents a perspective view of my saw with the tooth-point removed, and Figure 2, a perspective with the tooth-point attached.

Similar letters indicate like parts in both figures.

The nature of my invention consists in the employment of a dovetailed point to the teeth of saws, as and for the purpose hereinafter specified.

To enable others skilled in the art to which my invention appertains, to make and use the same, I will now describe its construction and operation.

In the accompanying drawings—

A represents a segment of a saw, the teeth of which are formed with their edges cut out, as seen in the drawings.

This saw can be made of iron or any other suitable material.

*b* represents a steel point, which is cut so as to form a dovetail with the saw-tooth, as seen in fig. 2, and is provided with the key *d*, which is driven into a mortise formed into the steel point near the dovetail, which firmly secures the point to the tooth of the saw.

By this arrangement, the steel points can be taken off, and ground upon a stone. Thereby the long and tedious operation of filing is avoided.

Having thus described my invention,

What I claim as new, and desire to secure by Letters Patent, is—

A saw provided with the steel dovetail point *b*, substantially in the manner and for the purpose described.

In testimony that I claim the foregoing as my own, I affix my signature, in presence of two witnesses.

W. B. NOYES.

Witnesses:
 C. H. MARSHALL,
 N. P. HUNT.